M. A. ENGER.
BOILER CHECK SHUT-OFF VALVE.
APPLICATION FILED JUNE 1, 1918.

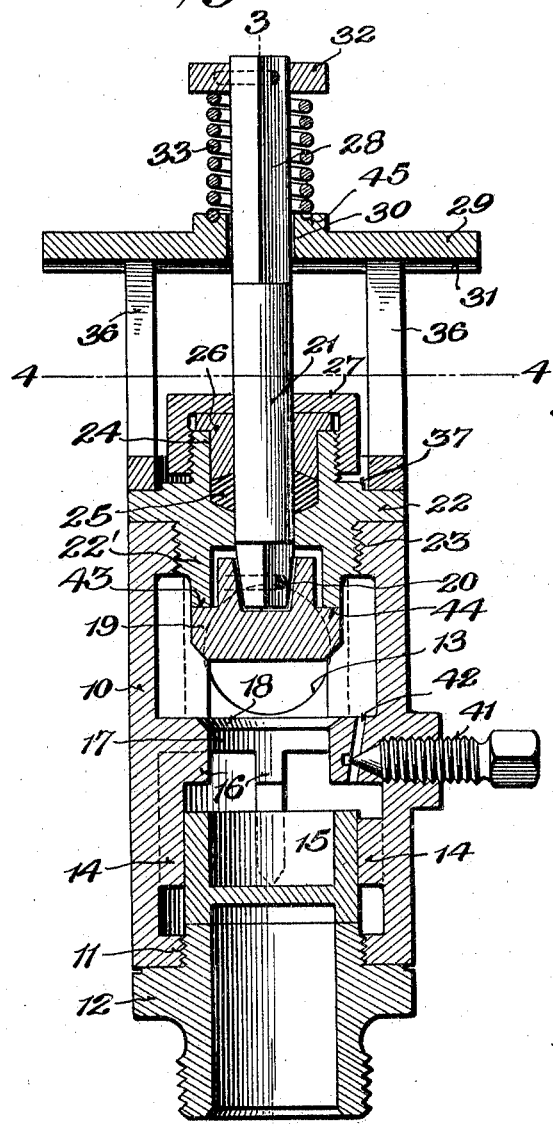
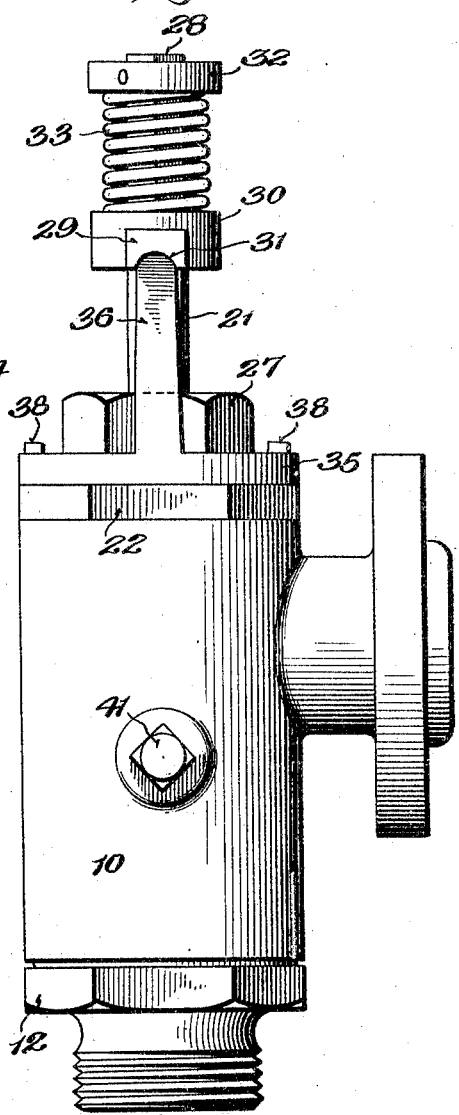

1,399,470.

Patented Dec. 6, 1921.
2 SHEETS—SHEET 2.

Inventor
Martin A. Enger;

WITNESS:—

UNITED STATES PATENT OFFICE.

MARTIN A. ENGER, OF WILLMAR, MINNESOTA, ASSIGNOR OF ONE-HALF TO RUSSELL SPICER, OF WILLMAR, MINNESOTA.

BOILER-CHECK SHUT-OFF VALVE.

1,399,470.          Specification of Letters Patent.          Patented Dec. 6, 1921.

Application filed June 1, 1918.  Serial No. 237,727.

*To all whom it may concern:*

Be it known that MARTIN A. ENGER, a citizen of the United States, residing at Willmar, in the county of Kandiyohi and State of Minnesota, has invented new and useful Improvements in Boiler-Check Shut-Off Valves, of which the following is a specification.

The present invention relates to valves, and particularly to a shut off valve adapted for use in combination with a check valve in the connection between a boiler or other vessel containing fluid under pressure and the instrumentality, such as a pump or injector, employed for supplying water or other fluid to the boiler.

One of the objects of the present invention is to provide a shut-off valve which, when it is desired to shut off the flow of fluid to the boiler so as to remove the check valve for purposes of repair or renewal or for any other reason, may be readily brought to its seat without causing damage to the seating surfaces.

A further purpose of the invention is to provide a valve construction wherein the scale which collects on the seat, may be readily removed without removing any of the internal parts of the construction so that the valve may be readily brought to its seat and leakage of fluid past the valve is entirely prevented.

In the present invention the valve is very simple in construction, may be readily manipulated and maintained in either a closed or open position without the employment of screw threads or the like, and the parts may be quickly assembled and installed.

The above and other objects of my invention are obtained in the structure described in the following specification and illustrated in the accompanying drawings, and wherein:

Figure 1 is a vertical sectional view of my improved construction, the shut-off valve being in open position.

Fig. 2 is an elevational view of the valve casing in the connection between the pumping instrumentalities and the boiler.

Figure 3:
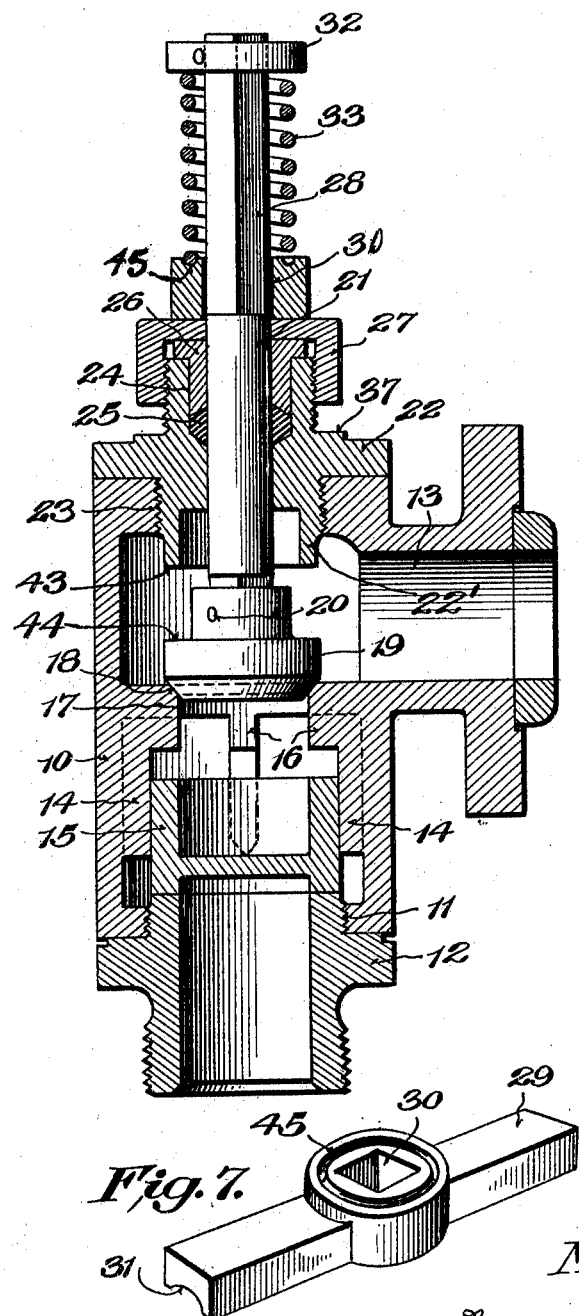
Fig. 3 is a view similar to Fig. 1 but taken at right angles thereto and showing the shut-off valve closed.

Referring to the drawings wherein like numerals represent like parts in the several views, 10 designates the valve casing for the check valve and shut-off valve. This casing is interposed in the connection between the boiler or other vessel containing fluid under pressure and the device, such as a pump, which forces the fluid to the boiler, the boiler or pumping devices not being shown in the present instance as they may be of any suitable construction. The inlet end of the casing 10 is threaded as at 11 so as to receive a coupling 12 connected to the pipe leading from the pumping instrumentality. The outlet of the valve casing, designated by the numeral 13, is disposed at right angles to the coupling 12 and is adapted to receive the pipe leading to the boiler.

In the present illustrative disclosure of my invention, I have shown the boiler check as being similar to that described and claimed in United States Letters Patent No. 1,180,989, granted to me April 25, 1916. Briefly, the check valve comprises guides 14 formed integral with the wall of the casing 10 and terminating at their lower ends at a point above the lower or seating edge of the valve 15 when the latter is fully open. At the upper ends of the guides 14 are abutments 16 which limit upward movement of the valve 15 and these abutments extend downwardly from a centrally apertured partition or flange 17. The coupling 12 extends inwardly of the threaded portion and into the enlarged bore of the casing 10 so that its inner end forms a valve seat for the check valve 15. The lower ends of the guides 14 are beveled. With this construction, an annular uninterrupted water space is provided about the valve seat for the valve 15 so that scales and the like freely pass over the seat.

The upper edge of the opening through the partition 17 is beveled so as to provide a conical valve seat 18 for the shut-off valve head 19. The valve head 19 is loosely connected, by means of a pin 20, to the lower end of a valve stem 21 so as to permit of a swivel movement and allow the head to readily accommodate itself to the seat. The valve stem 21 passes through a bonnet 22 having a threaded shank 22' which is screwed into a threaded opening 23 in the upper end of the casing 10 and this opening 23 is concentric to the valve seat 18 and is of greater diameter than the valve head 19 so that the latter may be readily inserted into the casing and brought to its seat. The outer end of the bonnet 22 is recessed as at 24 so as to provide a stuffing box which receives a packing 25 and a sleeve or ring 26. A cap 27 screwed about the threaded portion of the bonnet maintains the packing and sleeve in position.

Figure 4:
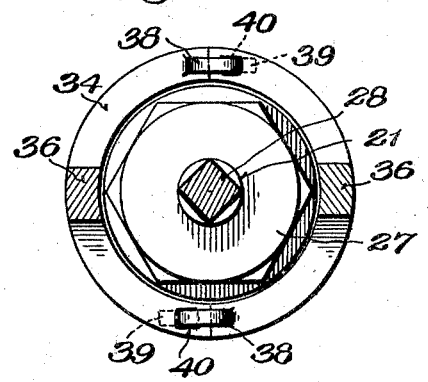
Fig. 4 is a sectional view taken on line 4—4 of Fig. 1.
Figure 7:
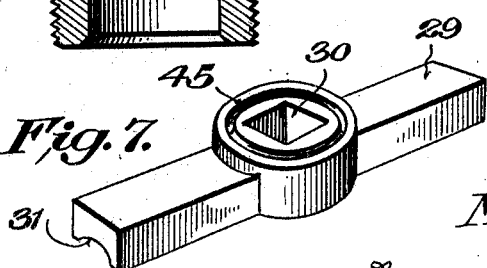
Fig. 7 is a perspective view of the handle whereby the shut-off valve may be rotated.

The inner end of the valve stem 21 is circular in cross section so that it may readily slide through the bonnet and stuffing box and be rotated therein, and the outer end of the valve stem is polygonal in cross section. In the present instance the outer end of the stem, as clearly shown in Fig. 4, is square in cross section, as at 28. The numeral 29 designates a handle having a square opening 30 for the reception of the square portion 28 of the stem and the under surface of the handle is concaved as at 31, Fig. 7, for a purpose hereinafter stated. Upon the outer end of the valve stem 21 is secured a ring or washer 32, and interposed between the washer and the outer surface of the handle 29 and surrounding the square portion 28 of the stem is a coiled spring 33 which normally urges the valve stem outwardly of the casing and the handle 29 toward the casing.

Figure 6:
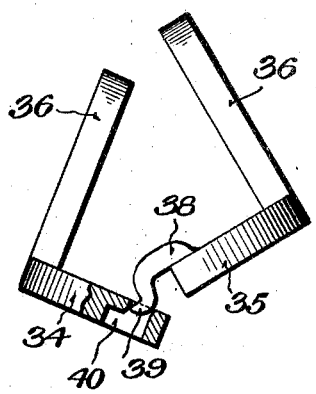
Fig. 6 is a view similar to Fig. 5 but illustrating the manner of locking the two sections of the device together.
Figure 5:
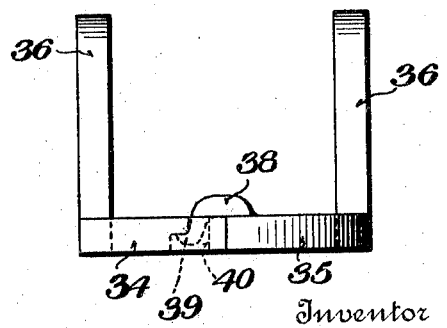
Fig. 5 is an elevational view of the device for maintaining the valve in open position.

For the purpose of maintaining the handle 29 in spaced relation to the cap 27 and thus hold the shut off valve in open position, a supporting device is interposed between the bonnet 22 and the handle and this supporting device, as most clearly shown in Figs. 5 and 6, comprises a ring formed of two interlocking sections 34 and 35 from each of which an arm or post 36 arises. The ring of the support is adapted to rest upon the outer surface of the flange of the bonnet 22 and is of sufficient internal diameter to be inserted over the cap 27. To hold the support against lateral movement, the bonnet has an annular boss 37 about which the ring sections 34 and 35 fit. The two sections 34 and 35 are adapted to interlock, the section 35 having at its opposite ends inverted U-shaped fingers 38 which terminate in lugs 39, and adjacent the ends of the section 34 are L-shaped openings 40 which receive the outer ends of the fingers 38 and lugs 39. To maintain the handle 29 outwardly of the casing 10, the supporting device is inserted between the handle and the bonnet 22 and in this operation, the two sections of the ring are brought together so as to surround the stem; the free ends of the arms 36 are moved inwardly so that the sections 34 and 35 are at an angle to each other; the lugs 39 are brought into position in the opening 40 of the other section 34; and then the two sections 34 and 35 are swung to bring the sections into the same plane and in position upon the bonnet. The handle 29 is moved outwardly upon the stem 21 and against the tension of the spring 33 until the outer ends of the posts 36 are reached at which time the handle is turned into position over the outer ends of the posts 36 and then released. The outer ends of the posts 36 are convex so as to snugly fit in the concave surfaces 31 of the handle and maintain the latter in place.

When a valve is brought to its seat at the same time that a fluid under relatively high pressure is flowing pass the valve, the seat and valve head become pitted due to the increased velocity with which the steam or other fluid passes between the head and seat when the latter has about reached its seat. To overcome this difficulty the flange or partition 17 is provided with a through opening 42 which forms a by-pass about the valve seat 18 so that when the shut-off valve 19 is seated, communication may be established between the chamber for the shut-off valve and the chamber for the check valve 15. The flow of fluid through the by-pass is controlled by the needle valve 41.

It will be noted from the drawings that the shank portion 22' of the bonnet 22 extends into the chamber housing the shut-off valve 19 so as to provide a seating surface 43. The upper or back surface 44 of the head 19 is flat so that it may snugly engage the surface 43 when the shut-off valve is in open position. These surfaces 43 and 44 are preferably ground so as to provide a tight steam joint when in engagement with each other and thus permit renewal of the packing 25 without shutting off the flow of fluid through the valve casing 10. The handle 29 is provided on its upper surface and about the opening 30, with a groove 45 which receives the lower end of the spring 33 so as to maintain the spring in correct axial alinement about the valve stem 21.

The operation of my device will be readily understood from the foregoing description. When the shut-off valve 19 is in open position, as shown in Fig. 1, the fluid will flow pass the check valve 15 and through the outlet 13 to the boiler. In the event the pressure within the boiler becomes excessive, the back pressure will force the check valve 15 to its seat. When it is desired to shut off the flow of fluid to the boiler for any reason, such as for the purpose of removing the check valve 15 or to grind the seat thereof, the needle valve 41 is turned to open the by-pass 42. The handle 29 is then raised from the posts 36 and the two sections of the supporting device are tipped into position shown in Fig. 6 and then removed from about the stem. The handle is then released to bring the head 19 to its seat 18 and the head is maintained in this position by the pressure above the head. Due to the by-pass 42, pressure in the check valve chamber will equalize to the pressure in the chamber for the shut-off valve 19 so that there is not a rush of fluid between the valve seat 18 and the head 19 when the latter is brought to its seat 18 and thus no damage is caused to the seating surfaces. After the head 19 is brought to its seat the by-pass 42 is closed. Since the valve stem 21 is circular in cross section where it passes through the bonnet 22, the valve stem may be rotated or reciprocated by means of the handle 29 to clear the valve seat 18 of scale or the like, and thus prevent leakage past the head 19, when it is seated.

To open the shut-off valve the by-pass 42 is open, the handle 29 is pulled upwardly until the back surface 44 of the head engages the seating surface 43, and then the supporting device is inserted to maintain the spring 33 under compression. Thereafter the by-pass 42 is closed.

It is, of course, obvious that my invention is susceptible of various modifications and changes which would be within the spirit of the invention without departing from the scope of the following claims.

What I claim is:

1. In combination, a check valve, a chamber therefor, a shut-off valve, a chamber therefor, a centrally apertured partition through which said chambers communicate, a by-pass between said chambers, and means for controlling the passing of fluid through said by-pass.

2. In combination, a casing having a check valve chamber and a shut-off valve chamber, a centrally apertured partition through which said chambers communicate, a check valve in said first chamber, a shut-off valve in the second chamber and adapted to engage said seat, a by-pass about said seat permitting communication between said chambers, and a valve controlling said by-pass.

3. A valve having a chamber provided with an opening, a valve stem extending through and reciprocating in said opening, a movable handle carried by the stem, means for limiting outward movement of the handle on the stem, and removable means for maintaining the handle against said limiting means to hold the valve open.

4. A valve having a casing provided with an opening, a valve stem having a circular portion extending through said opening and a non-circular portion, a handle on said non-circular portion of the stem and adapted to move longitudinally thereon, an abutment on the outer end of said stem, a spring between said handle and abutment, and removable means for maintaining said handle outwardly of the casing to hold the valve open.

5. A valve having a casing provided with an opening, a valve stem having a circular portion extending through said opening and a non-circular portion, a handle on said non-circular portion of the stem and adapted to move longitudinally thereon, an abutment on the outer end of said stem, a spring between said handle and abutment, and interlocking means about the stem and between said casing and handle to maintain the latter outwardly of the casing.

6. A valve having a casing provided with an opening, a valve stem having a circular portion extending through said opening and a non-circular portion, a handle on said non-circular portion of the stem and adapted to move longitudinally thereon, an abutment on the outer end of said stem, a spring between said handle and abutment, and interlocking means about the stem and between said casing and handle to maintain the latter outwardly of the casing, said interlocking means comprising a ring in two sections adapted to interlock and a post arising from each section of the ring.

7. A valve having a casing provided with an opening, a valve stem having a circular portion extending through said opening and a non-circular portion, a handle on said non-circular portion of the stem and adapted to move longitudinally thereon, an abutment on the outer end of said stem, a spring between said handle and abutment, and means comprising a ring of two sections adapted to rest on said casing about the stem and a pair of arms arising from said ring and adapted to receive on their outer ends said handle, the ends of one of said sections of the ring having fingers adapted to lock in recesses in the ends of the other sections.

8. A valve having a casing provided with an opening, a valve stem extending through and reciprocating in said opening, a handle carried by said stem and adapted to move longitudinally thereon, means for limiting outward movement of the handle on the stem, and means comprising two interlocking sections mounted about the stem and between the handle and casing for maintaining the handle outwardly to hold the valve open.

In testimony whereof I have hereunto set my hand.

MARTIN A. ENGER.